July 31, 1934.  E. S. BISHOP  1,968,436
AIR FILTER
Filed Nov. 21, 1930  2 Sheets-Sheet 1

Inventor
Edmund S. Bishop,
By Joseph J. Duhass
Attorney

July 31, 1934.  E. S. BISHOP  1,968,436
AIR FILTER
Filed Nov. 21, 1930   2 Sheets-Sheet 2

Inventor
Edmund S. Bishop,
By Joseph J. Juhasz
Attorney

Patented July 31, 1934

1,968,436

UNITED STATES PATENT OFFICE 1,968,436

AIR FILTER

Edmund S. Bishop, Bronx, N. Y.

Application November 21, 1930, Serial No. 497,286

4 Claims. (Cl. 183—69)

The invention relates to filters and particularly to that type of filter adapted for cleaning air.

The principal object of the invention is to provide a device of the character which is exceedingly economical to produce and one which is highly efficient in operation.

The type of air filter most commonly used today comprises a heavy bulky casing enclosing a plurality of foraminous metal members. The metal members are coated with a viscous material to which the particles of dust and dirt adhere as the air is passing through the filter. After being in use for a time, the foraminous metal members must be thoroughly cleaned and recoated with the viscous material. This operation entails considerable labor and expense.

The present invention contemplates the construction of a dry filter which may be readily and quickly cleaned by a vacuum means. The filter medium is made of light weight material and therefore the entire weight of one of the filter units is only a fraction of the weight of the present type all metal unit.

Another important aspect of the invention is the fact that the filter medium is inexpensive and after being used for a long time, if it is desired to renew it, this may be done with great ease and trifling cost.

A number of other objects and advantages will become apparent as the specification proceeds. Referring to the drawings forming a part thereof and in which a preferred form of the invention is illustrated:

Figure 1:
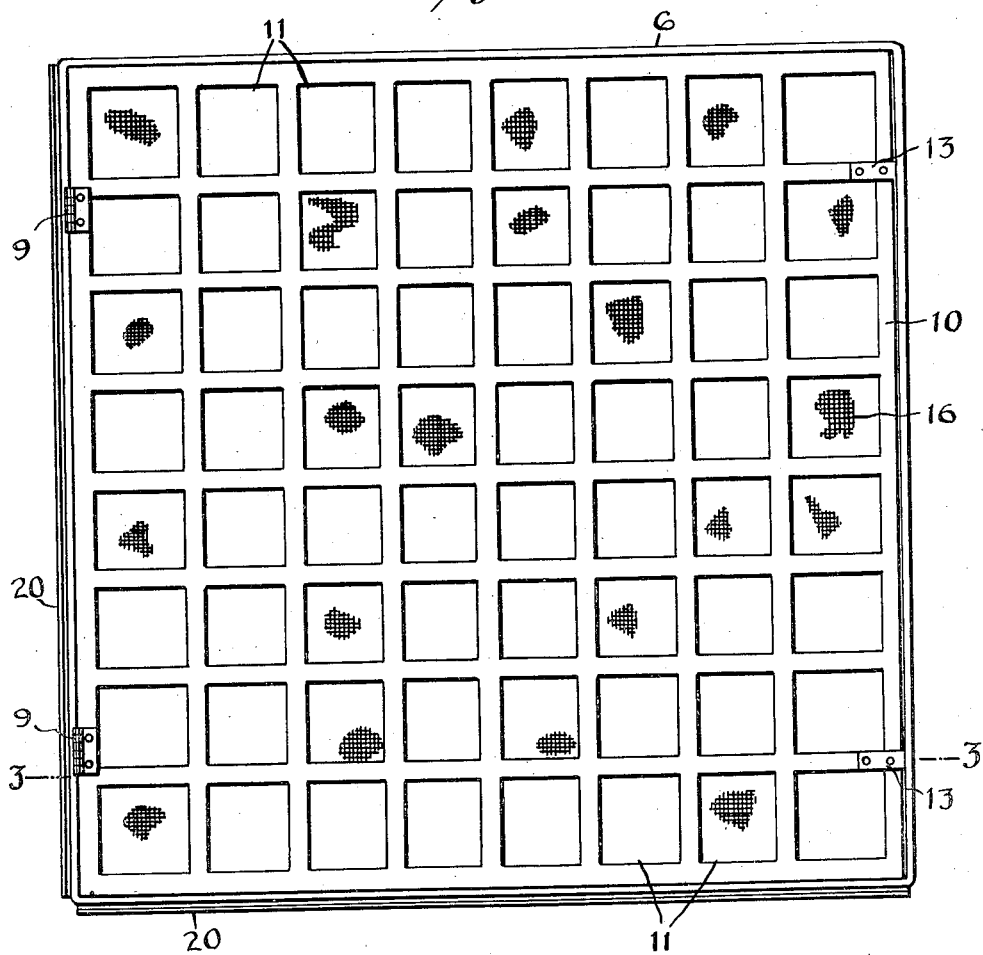
Figure 1 is a plan view of the improved filter.
Figure 2:
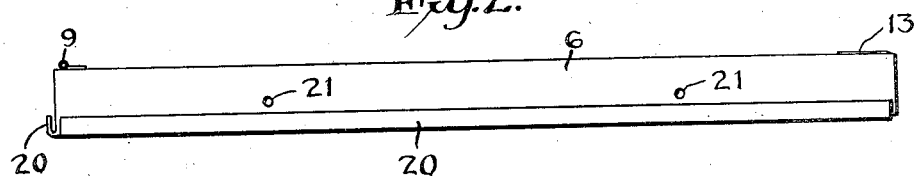
Figure 2 is an edge view.
Figure 3:
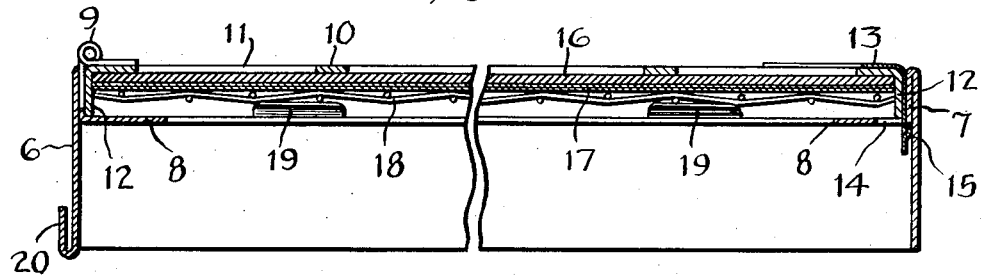
Figure 3 is a detail sectional view on a larger scale, the intermediate portion of the filter being broken out for economy of space, and is taken on line 3—3 of Figure 1.

Referring again to said drawings, the reference numeral 6 designates the frame of the filter unit. These frames are preferably rectangular in shape and are so arranged that a filter of any desired area may be built up. The walls of the frame are preferably bent back on themselves as indicated at 7 and have an inwardly extending flange 8.

Hinged at 9 to the frame is an apertured flanged metal sheet 10, the apertures in the sheet being designated by the numeral 11 and the flange by the numeral 12. The flange 12 is adapted in the closed or operative position of the filter to rest against the inwardly extending flange 8 of the frame.

Means are provided for securing the sheet 10 in position on the frame. Spring catches 13 are secured to the sheet 10 on the side opposite the hinges 9. The spring catches pass through openings 14 in the flange 8 and are provided with pressed up tits 15 which catch under the bent back portion 7 of the frame. The means for hinging and securing the flanged apertured plate in the frame may be varied.

The apertures 11 in the plate 10 are made as large as possible, consistent with the strength requisite for the rigidity of the frame, as to provide for the ingress of the greatest amount of air. However, it is considered an advantage of the present structure to provide a smooth even surface on the sheet 10 so as to facilitate the use of a vacuum means for cleaning the filtering medium hereinafter described.

The filtering medium comprises one or more layers of a coarsely woven fabric 16 such as woven jute, as for example, burlap, asbestos, cocoa matting or like material and one or more layers 17 of cheese cloth or material having similar properties. The loosely woven fabric 16 removes the coarse dirt or large particles from the air and the cheese cloth 17 extracts all the finer particles. The layer of coarsely woven fabric rests against the apertured sheet 10 and the layer of cheese cloth rests adjacent the coarsely woven fabric. Both layers of filter material are confined between the apertured sheet 10 and a metal screen 18. In this manner an efficient and ideal dry filter is formed. It may be easily and quickly cleaned by a vacuum cleaner and if it is desired to renew the filter medium this may also be accomplished with a minimum amount of trouble and expense. The screen member is held in position by clips 19 brazed or otherwise secured to the flanges 12. These clips may be easily bent back when inserting or removing a new filter medium.

In the filter units in use at the present time it is necessary to remove a unit from the installation when it has to be cleaned and immersed again in the viscous fluid. One of the particular and important advantages of the present structure resides in the fact that the filter medium may be cleaned or renewed, if desired, without removing the frame from position.

Figure 4:
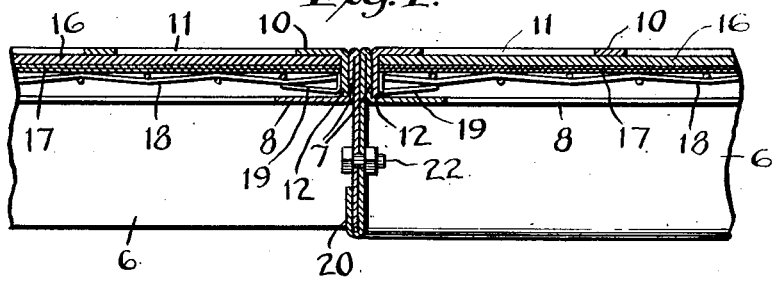
Figure 4 is a fragmentary detail sectional view showing a pair of filter units secured together.
Figure 5:
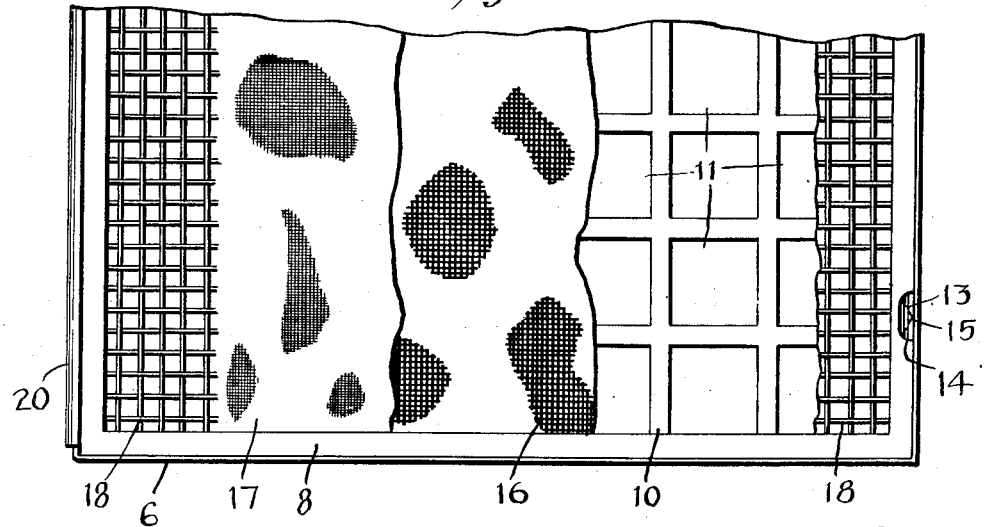
Figure 5 is a fragmentary plan view looking at the opposite side to that illustrated in Figure 1, and having the different layers of the filter medium broken away.

Two sides of the frame 6 are provided with bent back flanges 20. In making up a section of a plurality of filter units, the turned up flanges 20 engage the plain sides of adjacent frames as illustrated in Figure 4. Holes 21 are provided in the sides of the frame for the reception of bolts 22 when securing a plurality of the filter units together.

A perforated sheet similar to the outside sheet 10 might be used instead of the screen 18 or if desired a screen might be used instead of the sheet, the important feature of the invention residing in the confining of layers of coarsely woven fabric and cheese cloth or similar material between sheets of metal provided with openings for a free passage of the air.

Numerous changes in details of construction and arrangements of parts might be made by one skilled in the art without departing from the spirit of the invention or the scope of the appended claims.

I claim:

1. An air filter comprising a frame, a flanged apertured metal sheet hinged to said frame, a layer of coarsely woven fabric adjacent said sheet, a layer of cheese cloth adjacent said coarsely woven fabric, a metal screen member carried by said sheet for pressing said layers of coarsely woven fabric and cheese cloth against said flanged apertured sheet, and means carried by the flange of said sheet for holding said screen member in position whereby said fabric and said cloth may be carried by said sheet as the latter is swung about its hinge.

2. An air filter comprising a rectangular frame adapted to cooperate with adjacent rectangular frames to form a unit of a composite filter, an apertured flat metal plate hinged to said frame, a filter medium comprising a plurality of sheets of fibrous textile material, said sheets being of different mesh and adjacent to said perforate plate and means carried by said perforate plate for removably holding said filter medium in contact with said plate whereby said sheets may be retained in proper filtering relation while the plate is swung about its hinge.

3. An air filter comprising a rectangular frame adapted to cooperate with adjacent rectangular frames to form a unit of a composite filter, an apertured flat metal plate hinged to said frame, a filter medium comprising superposed sheets, certain of said sheets being of woven jute and certain of said sheets being of cheese cloth and means carried by said plate for removably retaining said sheets in firm contact with said plate whereby said sheets may be retained in proper filtering relation while the plate is swung about its hinge.

4. An air filter comprising a frame adapted to cooperate with adjacent similar frames to form a unit of a composite filter, a flat apertured plate hingedly attached to said frame to form a perforate cover therefor and a filter medium removably carried by said frame comprising layers of woven jute and layers of cheese cloth, said jute being adjacent to said perforate plate and means on the opposite side of said filter medium for furnishing mechanical support to said cheese cloth throughout its area whereby said layers may be retained in proper filtering relation while the plate is swung about its hinge.

EDMUND S. BISHOP.